July 24, 1962 L. C. DOWNES 3,045,916
AUTOCORRELATION DETECTOR CIRCUIT
Filed May 20, 1955 2 Sheets-Sheet 1

LLOYD C. DOWNES
*INVENTOR.*

BY

HIS ATTORNEY

LLOYD C. DOWNES
*INVENTOR.*

HIS ATTORNEY

3,045,916
AUTOCORRELATION DETECTOR CIRCUIT
Lloyd C. Downes, Los Angeles, Calif., assignor to Hoffman Electronics Corporation, a corporation of California
Filed May 20, 1955, Ser. No. 509,903
7 Claims. (Cl. 235—181)

This invention is related to autocorrelation detector circuits and, more particularly, to an improved autocorrelation detector circuit suitable for radar applications, for example, in which the autocorrelation process is accomplished during the unused portion of one pulse period.

Within recent years, a new communication theory based on the statisical concept of information has been developed and has attracted the attention of a considerable number of established scientific and engineering circles. From this new theory has evolved two mathematical functions, called correlation functions, which have interesting applications in communication engineering. These correlation functions shall be hereinafter explained.

It is well known that every electromagnetic wave transmission will at any instant possess three properties, namely, amplitude, frequency, and phase, any one or all three of these properties being a function of time with respect to a particular time origin. All electromagnetic transmissions appear to fall into two well defined categories: (1) periodic functions (such as a sinusoid), and (2) random processes (such as noise). It is the latter of these two categories with which correlation functions in general and the present invention in particular are concerned. The random processes with which this particular invention is interested are of the stationary variety; that is to say, the statistical properties of the random processes which will be under discussion will be invarient despite a shift in time origin. In other words, these random processes are stationary in time.

Both messages and noise may be regarded as stationary random processes and are conventionally described in terms of probability distribution functions. These functions are quite generally difficult to determine both theoretically and experimentally. However, there are other characteristics or functions which are in turn dependent upon the distribution functions and are actually preferable for employment in theoretical and experimental treatment of the processes. These functions are, again, the correlation functions.

The basic correlation functions are two in number and are called the autocorrelation function and the cross-correlation function. The autocorrelation function is mathematically defined as:

(1) $$\phi_{11}(\tau) = \lim_{T \to \infty} \frac{1}{2T} \int_{-T}^{T} f_1(t) f_1(t+\tau) dt$$

where $f_1(t)$ represents a member function of the stationary random process in question, $f_1(t+\tau)$ is the member function shifted by a time increment $\tau$, and T is the time interval over which the integration is performed, T being large in comparison with the period of the member function. Equation 1 shows that what is done mathematically is to (1) consider a member function of a stationary random process of considerably long duration, (2) consider a function identical with the member function only shifted in time origin by a time increment $\tau$, (3) multiply one function point by point by the other function and thereby obtain a third function, and (4) obtain the mean value of this third function for all values of $\tau$. The Ergodic theorem states, interestingly enough, that over a period of long duration the autocorrelation function obtained from a member function of a random process is the same as that obtained from the process as a whole. In short, a time average is equivalent to an ensemble average for a stationary random process.

If noise be considered as a stationary random process ensemble which is symmetrical about a zero axis, then it will follow that the mean of the autocorrelation product will be zero. Hence, the autocorrelation function of noise which is symmetrical (equally positive and negative) about a zero axis is equal to zero. Moreover, even though the noise time function may be of one polarity, nevertheless a moment's reflection will show that for appreciable values of $\tau$, e.g., appreciable time shifts, either the first term or the second term of the autocorrelation product will be zero from a probability viewpoint so that the autocorrelation function itself will be zero, or at least definitely approach zero.

On the other hand, it may easily be shown that the autocorrelation function of a sinusoid is another sinusoid. Further, it is likewise true that a message in the form of a space-modulated or duration-modulated pulse train will be a function having appreciable magnitude for relatively small values of $\tau$. This consideration of noise functions and message functions indicates that if there is provided electrical means for obtaining the autocorrelation functions of a noise function and a message function simultaneously, that comparison of the respective autocorrelation functions will indicate a markedly increased signal-to-noise ratio. Suppose for example that there is being translated a signal $f_1(t)$ equal to a noise function $(f_N(t))$ plus a signal function $(f_S(t))$. The autocorrelation function of $f_1(t)$ will be (2) $$\phi_{11}(\tau) = \lim_{T \to \infty} \frac{1}{2T} \int_{-T}^{T} [f_N(t) + f_S(t)][f_N(t+\tau) + f_S(t+\tau)] dt$$

or (3) $$\phi_{11}(\tau) = \lim_{T \to \infty} \frac{1}{2T} \int_{-T}^{T} [f_N(t) f_N(t+\tau) + f_S(t) f_S(t+\tau)] dt$$

It is noted from Equation 3 that the cross-product (cross-correlation) terms have been dropped. This is because the mean of the noise function will be either zero or constant, depending upon whether the noise is symmetrical about a zero axis or whether the noise is wholly or partially of one polarity. With the above analysis must be kept in mind the fact that the time shift $\tau$ is relatively small in comparison to the period of the several member functions of the signal funtion and, simultaneously, $\tau$ is relatively large in comparison to the periods of the several member functions of the noise function. Equation 3 may have the term on the right separated into two integrals in which the first integral, i.e., the autocorrelation function of the noise function will become zero or approach zero rapidly because of the above reasoning. The second term, i.e., the autocorrelation function of the signal function will be definite and appreciable for relatively small values of $\tau$ in comparison with the periods of the several member functions of the signal function. These results forceably suggest the employment of correlation techniques in detectors. Lee and Wiesner of the Massachusetts Institute of Technology have devised an electronic correlator which will produce graphically the autocorrelation curve for any input stationary random process. This electronic correlator and others are exceedingly complex mechanisms. The present invention, however, provides electronic apparatus of relatively simple design which will incorporate the principles of correlation functions with any conventional radar system for the purpose of (1) obtaining satisfactory signal-to-noise ratios and (2) for enabling the cascading of the inventor's electronic circuit to provide for the detection and investigation of the entire ensemble return of the associated receiving apparatus.

Therefore, it is an object of the present invention to provide a new and useful autocorrelation detector circuit.

It is a further object of the present invention to provide an autocorrelation detector circuit which may be employed in a radar system to operate during the unused portion of a range sweep cycle.

It is an additional object of the present invention to provide for the cascading of several circuits of the applicant's invention so as to enable the investigation of the signal ensemble return from the entire range covered of a radar system being employed.

According to the present invention in its broadest aspect, a signal-noise input is gated into an autocorrelation circuit during the time interval in which the desired signal is likely to appear. During the time remainder a feed-back path is gated into the autocorrelation circuit so as to provide for an output pulse having a signal-to-noise ratio greatly superior to the input signal and constituting a unique pulse the shape of which approximates the autocorrelation curve of the repetition of a single input pulse. The output signal pulse is subsequently gated out of autocorrelation circuit into the succeeding stages.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
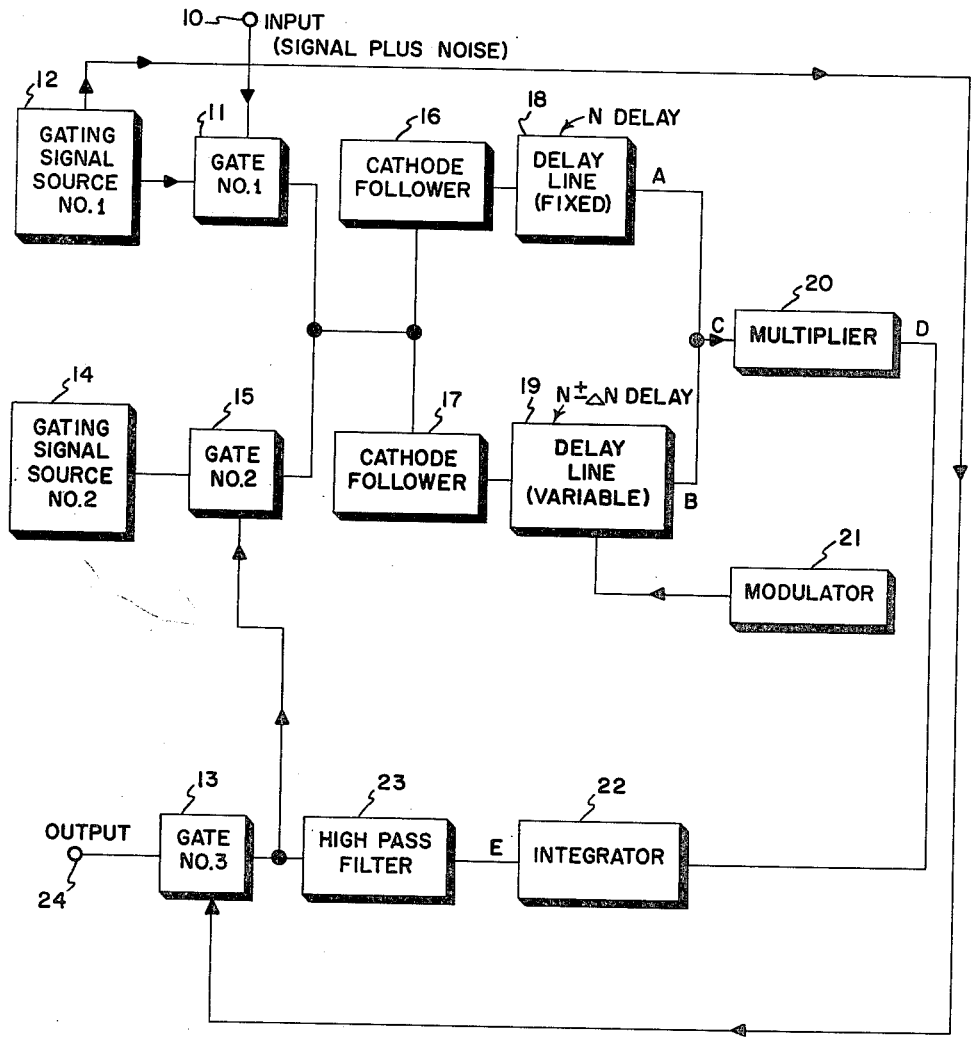
FIGURE 1 is a schematic diagram of an autocorrelation detector circuit according to the present invention.
Figure 2:
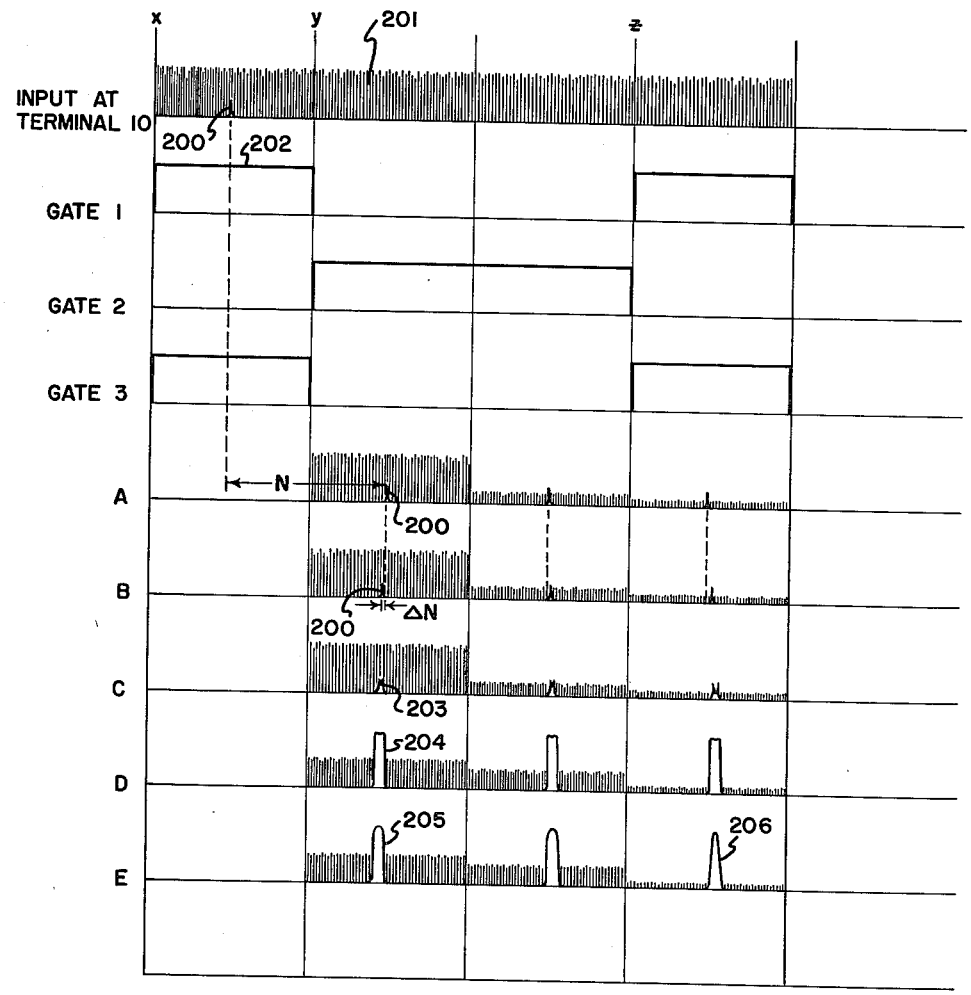
FIGURE 2 is a representation of the various wave shapes exhibited at various points in the circuit of FIGURE 1.

For the sake of clarity FIGURES 1 and 2 shall be discussed concurrently. In FIGURE 1, input terminal 10 is coupled to gate 11 and is adapted for coupling to an input signal source (supplying signal plus noise). Gating signal source 12 is coupled to gate 11 and also to gate 13. Gating signal source 14 is directly coupled to gate 15. The output circuits of gates 11 and 15 are jointly coupled to the input circuit of cathode followers 16 and 17 which in turn are coupled through fixed delay line 18 and variable delay 19, respectively, to the input circuit of multiplier 20. Delay line 19 may be of the electrically variable type described in the co-pending application by this same inventor dated March 24, 1955, and entitled "Variable Dynamic Storage Device." Modulator 21 is directly connected to the input modulating circuit of variable delay line 19 and may be a sawtooth generator, for example. The output from multiplier 20 is fed through integrator 22 and subsequently through high-pass filter 23 to the input side of gate 13. The junction of high-pass filter 23 and gate 13 is directly connected to the input side of gate 15. The output from gate 13 is taken from output terminal 24.

The circuit shown in FIGURE 1 operates as follows. Gates 11 and 13 are normally biased beyond cut-off so that in the absence of a positive gating signal from gating signal source 12 gate circuits 11 and 13 will be non-conducting. Let it be assumed that an input signal pulse will occur between time $x$ and time $y$ as shown in FIGURE 2. Let it also be assumed that the signal-to-noise ratio is highly unsatisfactory, say for example the signal is 10 or 15 db down. With conventional detectors, then, signal pulse 200 in the presence of noise level 201 will be extremely difficult to detect. With the occurrence of positive gate pulse 202, pulse 200 and the accompanying random noise will be passed through gate 11 to the input circuits of cathode followers 16 and 17. Cathode followers 16 and 17 are designed to match the input impedance of delay lines 18 and 19, respectively. Let the time duration between time $x$ and time $y$ be N microseconds. Further, let the unused time interval $y$—$z$ be a multiple, say 2, of N. Further, let the time delay of delay line 18 be N microseconds and let the nominal time delay of variable delay 19 be N microseconds. Upon passage through delay line 18, input pulse 200 will appear on graph A, N microseconds later (see FIGURE 2). Assume that the time delay of delay line 19 is ΔN less than N microseconds. In such a case, pulse 200 on graph B will appear, as shown in FIGURE 2, slightly sooner than pulse 200 on graph A. Pulses 200 on graphs A and B will unite and combine into pulse 203 on graph C as shown. It must be remembered that pulse 203 is in fact a combination of two pulses and that the only difference in character between these two pulses is one of a slight time or phase displacement. Thus, pulse 203 may be considered as a combination of two functions, namely, $f_1(t)$ and $f_1(t+\tau)$. These two functions comprising pulse 203 are multiplied together by means of multiplier 20 the output from which appears as pulse 204 on graph D of FIGURE 2. By virtue of the action of multiplier 20 it is noticed that the noise level on graph D which accompanies pulse 204 has been greatly reduced. The output signal and accompanying noise shown on graph D are introduced to integrator 22 the output from which appears as pulse 205 with its accompanying reduced noise level, appearing on graph E, as shown in FIGURE 2. Output pulse 205 is fed through high-pass filter 23 which serves as a pulse shaper. Since gate 13 is still closed, no output signal will appear at output terminal 24. Gate 15, however, is open and hence the output signal from high-pass filter 23 is fed through gate 15 to cathode followers 16 and 17. The sequence above described is accordingly repeated twice until gate 13 finally opens and gate 15 simultaneously finally closes, at which time output pulse 206 with an accompanying negligible noise level will appear at output terminal 24.

The modulating voltage applied to variable delay line 19 by modulator 21 may, for example, be of sawtooth character with the additional restriction that the maximum ΔN or $\tau$ time delay will not be such as to entirely separate the time occurrence of pulses on graphs A and B. The exact character of the output wave shape of modulator 21, in order to preserve with precision range information or other desired data will depend ultimately upon the expected shape of the input signal.

The complete success of the above autocorrelation system may be demonstrated experimentally in which input noise-to-signal ratios of the order of 15 db may produce output signal-to-noise ratios as high as 20 db, thus evidencing an over-all system gain of 35 db.

It must be called to mind that the design of the above system is suited for detection of a radar signal which is expected to occur within the $x$—$y$ time region shown in FIGURE 2. If the entire spectrum, i.e., the $x$—$z$ time region, is to be observed, several FIGURE 1 circuits may be cascaded and their outputs combined so that such observation is made possible. In such a case, the time duration and occurrence of the gate signals would be adjusted accordingly.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An autocorrelation circuit including, in combination, an input terminal, a first gate circuit coupled to said input terminal, a first gating signal source coupled to said first gate circuit for opening recurrently said first gate circuit for a first predetermined time interval, a second gate circuit, a second gating signal source coupled to said second gate circuit for opening said second gate circuit, a second time interval comprising the time duration between recurrent openings of said first gate circuit, the duration of the openings of said second gate circuit also constituting a predetermined whole multiple of said first time interval, first and second time delay circuits differing in electrical length coupled in parallel to each of said first and second gate circuits, a multiplier coupled jointly to said first and second time delay circuits, an integrator coupled to said multiplier and having an output circuit, a third gate circuit coupled to said output circuit of said integrator and also to said first gating signal source to be opened simultaneously with said first gate circuit, said output circuit of said integrator also being coupled to said second gate circuit, and an output circuit coupled to said third gate circuit.

2. Apparatus according to claim 1 in which said output circuit of said integrator includes a pulse shaping circuit.

3. Apparatus according to claim 2 in which said pulse shaping circuit comprises a high-pass filter.

4. Apparatus according to claim 2 in which said pulse shaping circuit comprises a band-pass filter.

5. Apparatus according to claim 1 comprising first and second cathode followers coupled between the junction of said first and second gate circuits and said first and second time delay circuits, respectively.

6. Apparatus according to claim 5 in which said second time delay circuit comprises a variable delay line having an input circuit.

7. Apparatus according to claim 6 comprising a modulating voltage source coupled to said input circuit of said variable delay line.

References Cited in the file of this patent

UNITED STATES PATENTS

| | | |
|---|---|---|
| 2,676,206 | Bennett et al. | Apr. 30, 1954 |
| 2,684,468 | McClure et al. | July 20, 1954 |